(12) United States Patent
Lee et al.

(10) Patent No.: US 6,312,521 B1
(45) Date of Patent: Nov. 6, 2001

(54) APPARATUS AND PROCESS FOR COATING PARTICLES

(75) Inventors: Laurence Lee, Owatonna; Frank Wyatt, Kasson; Heather Ganske, Owatonna; Eugene H. Sander, Hayfield, all of MN (US)

(73) Assignee: Primera Foods Corporation, Cameron, WI (US)

( * ) Notice: Subject to any disclaimer, the term of this patent is extended or adjusted under 35 U.S.C. 154(b) by 0 days.

(21) Appl. No.: 09/461,525

(22) Filed: Dec. 14, 1999

Related U.S. Application Data

(60) Provisional application No. 60/112,170, filed on Dec. 14, 1998.

(51) Int. Cl.$^7$ .............. B05C 5/02; B05C 11/00; A23G 3/00; B05D 1/00; F26B 17/00
(52) U.S. Cl. .............. 118/303; 118/19; 118/24; 118/62; 427/185; 427/213; 34/582; 34/585; 34/588; 239/135
(58) Field of Search ............ 718/24, 303, DIG. 5, 718/62; 427/213, 185; 118/19, 716, 310, 326; 34/582, 585, 588, 372; 239/128, 135

(56) References Cited

U.S. PATENT DOCUMENTS

| | | |
|---|---|---|
| Re. 32,307 | 12/1986 | Glatt et al. .............. 366/102 |
| 2,648,609 | 8/1953 | Wurster .............. 99/166 |
| 2,799,241 | 7/1957 | Wurster .............. 118/24 |
| 2,986,475 | 5/1961 | Mesnard et al. . | 
| 3,089,824 | 5/1963 | Wurster .............. 167/82 |
| 3,110,626 | 11/1963 | Larson et al. .............. 118/303 |
| 3,112,220 | 11/1963 | Heiser, Jr. et al. .............. 117/100 |
| 3,193,827 | 7/1965 | Jones et al. .............. 343/17.5 |
| 3,196,827 | 7/1965 | Wurster et al. .............. 118/24 |
| 3,207,824 | 9/1965 | Wurster et al. .............. 264/117 |
| 3,214,844 | 11/1965 | Oates et al. . |
| 3,241,520 | 3/1966 | Wurster et al. . |

(List continued on next page.)

FOREIGN PATENT DOCUMENTS

| | | |
|---|---|---|
| 195 28 564 A1 | 8/1997 | (DE) . |
| 0 574 173 A1 | 1/1993 | (EP) . |

OTHER PUBLICATIONS

Brochure. Glatt Air Techniques, Inc., Wurster Technology Will Never Be the Same!.
Brochure. Glatt Air Techniques, Inc., New Concept, The Basic Glatt Fluid Bed Processing System. . .
Brochure. Glatt Techniques, Inc., Air Glatt Fluid Bed Installation, 1986/87–5M.

Primary Examiner—Linda Gray
Assistant Examiner—J. A. Lorengo
(74) Attorney, Agent, or Firm—Kinney & Lange, P.A.

(57) ABSTRACT

A process used to coat particles in an upward flowing fluidized bed dryer includes an insert disposal within the dryer. The insert includes a vertically adjustable cylindrical partition and a vertically adjustable spray nozzle wherein the cylindrical partition has a diameter-to-length ratio greater than 1. The particles are fluidized using a gas and are processed through a coating zone containing the cylindrical partition and become coated with the liquid spray. The particles exit the coating zone and enter the reconditioning zone wherein the liquid is allowed to dry onto the particles. The particles fall into the fluidized bed and are reprocessed through the coating zone by a draft effect created by the atomizing gas in the spray nozzle. The insert provides liquid coating flexibility allowing for the coating of liquid fat onto the particles. Additionally, since less fluidizing gas is required and not all of the particle bed needs to be fluidized, the coating process is more efficient and gentle. The coating process is continued until a selected weight percentage relative to the weight of the particles is coated onto the particles.

22 Claims, 2 Drawing Sheets

U.S. PATENT DOCUMENTS

| | | | |
|---|---|---|---|
| 3,354,863 | * 11/1967 | Reynolds | 118/303 |
| 3,411,480 | 11/1968 | Grass, Jr. et al. | 118/24 |
| 3,443,621 | 5/1969 | Dubreuil | 159/4 |
| 3,607,365 | 9/1971 | Lindlof | 117/100 |
| 3,716,020 | 2/1973 | De Wit et al. | 118/303 |
| 3,828,729 | 8/1974 | Goodridge | 118/634 |
| 4,115,929 | 9/1978 | Staub et al. | 34/10 |
| 4,217,851 | * 8/1980 | Bichl et al. | 118/330 |
| 4,219,589 | 8/1980 | Niks et al. | 427/213 |
| 4,237,814 | 12/1980 | Ormos et al. | 118/24 |
| 4,335,676 | 6/1982 | Debayeux et al. | 118/303 |
| 4,389,978 | 6/1983 | Northcote | 122/4 |
| 4,442,888 | 4/1984 | Kuwata | 165/104.16 |
| 4,490,224 | 12/1984 | Warheit | 204/130 |
| 4,557,938 | 12/1985 | Sander et al. | 426/453 |
| 4,696,762 | 9/1987 | Sander et al. | 252/311 |
| 4,701,353 | 10/1987 | Mutsers et al. | 427/213 |
| 4,858,552 | * 8/1989 | Glatt et al. | 118/303 |
| 4,875,435 | 10/1989 | Jan et al. | 118/62 |
| 4,895,733 | 1/1990 | Imanidis et al. | 427/8 |
| 4,960,244 | 10/1990 | Maag et al. | 239/424 |
| 4,970,804 | 11/1990 | Huttlin | 34/57 |
| 5,008,109 | 4/1991 | Tin | 424/422 |
| 5,033,205 | 7/1991 | Dobso | 34/10 |
| 5,132,142 | 7/1992 | Jones et al. | 427/196 |
| 5,145,650 | 9/1982 | Huttlin | 422/143 |
| 5,236,503 | 8/1993 | Jones | 118/303 |
| 5,254,168 | 10/1993 | Littman et al. | 118/666 |
| 5,284,678 | 2/1994 | Hirschfeld et al. | 427/212 |
| 5,437,889 | 8/1995 | Jones | 427/188 |
| 5,470,387 | * 11/1995 | Liborius | 118/303 |
| 5,632,102 | 5/1997 | Luy et al. | 34/582 |
| 5,718,764 | * 2/1998 | Walter | 118/303 |

* cited by examiner

APPARATUS AND PROCESS FOR COATING PARTICLES

CROSS REFERENCE TO RELATED APPLICATION

Applicant claims the priority date of U.S. Provisional Application 60/112,170, filed Dec. 14, 1998.

BACKGROUND OF THE INVENTION

This invention relates generally to an apparatus and a method for spray coating discrete particles while the particles are suspended in a fluidized bed. More particularly, the present invention relates to an apparatus and a method of coating particles in an upward flowing fluidized bed dryer having an insert comprising a vertically adjustable cylindrical partition and a vertically adjustable spray nozzle.

The application of fluid bed technology for coating particles and forming agglomerates is well known in the art. Glatt Air Techniques, Inc. located in Ramsey, N.J., Vector Corporation located in Marion, Iowa, and Niro, Inc. located in Columbia, Md., the manufacturer of the Aeromatic dryer are three suppliers of batch type fluid bed dryers wherein the present invention is utilized. The batch fluid dryers are typically used in the pharmaceutical, polymer, food, and nutriceutical industries.

It is well known in the art to coat particles using a co-flow spray system in which the liquid droplets and the particles are both flowing in an upwardly direction. A patent to D. E. Wurster (U.S. Pat. No. 3,089,824) discloses a dryer in which the particles and liquid are flowing in the same upwardly direction. Additionally, the Wurster patent discloses a spray nozzle which is in contact with a mesh screen located at the bottom of the dryer. A patent to H. W. Mesnard et al. (U.S. Pat. No. 2,986,475) discloses a co-flowing dryer in which fluidizing gas is injected into the system in the center of the dryer while the liquid spray nozzle is positioned through the side of the dryer. Additionally, a patent to A. L. Heiser (U.S. Pat. No. 3,112,220) discloses an upward flowing fluidized bed dryer where the particles and the atomized liquid are flowing in the same upwardly direction. The Heiser patent also discloses a spray system with a dedicated liquid handling system. Uniform coating is difficult to achieve using the methods and dryer systems of any of these patents.

The next advancement in the coating of particles was to create a dedicated coating chamber and coating zone by the use of a partition within the dryer as disclosed in the patent to Wurster et al. (U.S. Pat. No. 3,241,520). Additionally, the Wurster et al. patent discloses, besides the dedicated coating zone, a subsident coating area or a reconditioning zone. Furthermore, the Wurster et al. patent discloses the spray nozzle being attached to the bottom screen.

A patent to G. W. Larson et al. (U.S. Pat. No. 3,110,626) discloses an upward flowing fluidized bed dryer with a dedicated coating zone by the use of a partition. Additionally, this patent discloses an atomizing nozzle which is mounted to a bottom screen.

A patent to Debayeux et al. (U.S. Pat. No. 4,335,676) discloses a spouted bed granulator and/or coating apparatus. The Debayeux et al. patent describes a process for coating particles in which the gas flow directing structure prevents contact and agglomeration of particles in the vicinity of the walls of the dryer. The flow in the apparatus disclosed in the Debayeux et al. patent provides a gaseous stream in an upward direction which allows the liquid spray nozzle to better coat the particles. The improved process is accomplished by reducing the diameter of the air duct around the spray nozzle.

A patent to Mutsers et al. (U.S. Pat. No. 4,701,353) discloses a spraying device in an upward flowing fluid bed dryer in which the liquid is sprayed with a gas creating a conical film. The resulting conical film spray pattern is not protected about its initial base by an upwardly moving column of gas. Additionally, the spray device is connected to the bottom plate of a spray dryer.

A patent to Maag et al. (U.S. Pat. No. 4,960,244) discloses an atomizing nozzle with constricted liquid tubes. The constricted liquid tubes eliminate the need for metering pumps or flow meters for each atomizing nozzle to control the flow of liquid through the spray nozzle.

A patent to Wurster (U.S. Pat. No. 3,196,827) discloses an upward flowing fluidized bed dryer with a fixed cylindrical partition which creates a dedicated coating zone. Additionally, the Wurster patent discloses a spray nozzle positioned below the cylindrical partition which is fixed to the air distribution screen on the bottom of the dryer. Finally, the Wurster patent discloses a cyclical process in which particles are coated in the coating zone and are carried through the coating zone with the fluidizing gas. Once the gas and particle velocities decrease when the particles leave the coating zone, the particles fall through the reconditioning zone and into the fluidized bed. The coated particles in the particle bed are pulled into the coating zone by a draft created by the upward flow of atomizing gas from the spray nozzle, after which the coating process is repeated.

A patent to David M. Jones (U.S. Pat. No. 5,437,889) discloses an adjustable cylindrical shield for the spray nozzle. The Jones patent discloses the purpose for the adjustable cylindrical shield for the spray nozzle is to control the entrance of particles into the spray pattern. The Jones patent further discloses that the controlled entrance of particles into the coating zone improves the liquid droplet pattern which in turn improves the coating quality of the process. Furthermore, the Jones patent discloses that the spray nozzle is mounted to the bottom atomizing air screen.

A patent to Littman et al. (U.S. Pat. No. 5,254,168) discloses a dual jet coating design. The coating spray is applied both upward and downward within a coating zone in which the cylindrical partition is adjustable within the coating zone. However, the bottom spray device is fixed onto the machine body. Additionally, the Littman patent discloses an adjustable spray nozzle that is adjustably positioned through the bottom fluidizing air screen, and the fluidizing air screen contains an aperture through which the spray nozzle is adjusted.

BRIEF SUMMARY OF THE INVENTION

The present invention includes a process during which particles are coated in an upward flowing fluidized bed dryer. The upward flowing fluidized bed dryer includes an insert containing a cylindrical partition with a diameter-to-length ratio greater than 1 wherein the cylindrical partition is vertically adjustable. Preferably, the insert contains a spray nozzle which also is vertically adjustable relative to the cylindrical partition. The insert of the present invention allows for a more gentle process wherein the particle coatings are more consistent without fractures or cracks.

The process comprises fluidizing a bed of particles with a gas stream through a fluidization screen in the bottom of the dryer. Atomizing gas and liquid are processed through the spray nozzle which atomizes the liquid. Particles are contacted with atomized liquid in the cylindrical partition and a coating zone. The particles are in a turbulent flow pattern allowing for more residence time in the coating zone which results in a more efficient and consistent coating process.

Once the particles leave the coating zone, the particles enter the reconditioning zone and fall back into the fluidized bed. In the process of falling into the fluidized bed the coating is dried onto the particles. The atomizing gas processed through the spray nozzle creates a draft around the cylindrical partition wherein particles within the fluidized bed are pulled into the cylindrical partition and the coating zone creating a cyclical process.

Because the cylindrical partition and nozzle are adjustable, only the top portion of the particle bed need be circulated, therefore, less atomizing gas is required than is required by the Wurster system. Requiring less atomizing gas results in a more gentle process, better and independent control of atomization quality, and a uniform finished particle size distribution.

DETAILED DESCRIPTION

Figure 1:
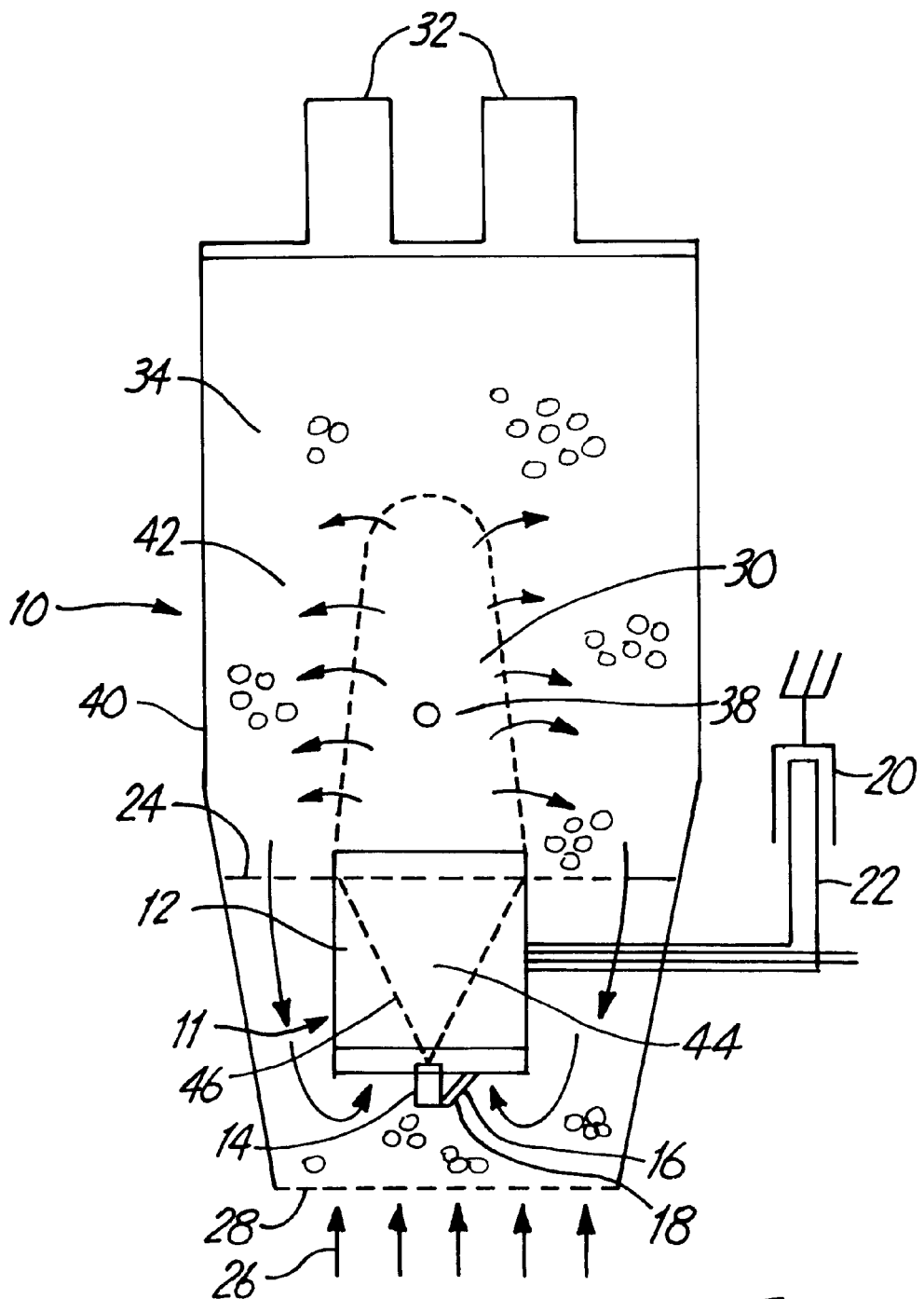
FIG. 1 is a schematic drawing of a fluidized upward flowing fluidized bed granulator or dryer in which the insert and nozzle are positioned within the fluidized bed granulator or dryer.

The present invention includes an insert 11 that is mounted into a conventional batch fluid bed dryer 10 which is designed for drying or agglomerating particles 42 or top spray coating particles 42 as illustrated in FIG. 1. Glatt Air Techniques, Inc. located in Rainsey, N.J., Vector Corporation located in Marion, Iowa, and Niro, Inc. located in Columbia, Md., the manufacturer of the Aeromatic dryer are three suppliers of batch type fluid bed dryers wherein the present invention is utilized. The insert 11 comprises a cylindrical partition 12 and a spray nozzle 14. Attached to the spray nozzle 14 are a heated liquid line 16 and an atomizing gas line 18.

The batch fluid bed dryer 10 contains three zones which are significant in coating particles; a fluidized bed 24, a coating zone 30, and a reconditioning zone 34. The fluidized bed 24 is a region in the bottom of the batch fluid bed dryer 10 wherein particles 42 are supported by a fluidizing gas 26 but are not circulated by the fluidizing gas 26. The coating zone 30 is a region in the batch fluid bed dryer 10 wherein the particles 42 are circulated and an atomized spray liquid 46 are in contact with each other. The coating zone 30 includes the interior of the cylindrical partition 12 and extends upward toward the top of the fluid bed dryer 10. The reconditioning zone 34 is a region within the batch dryer 10 extending outwardly from the coating zone 30 and downward to the fluidized bed 24 in which the atomized liquid 46 is dried onto the particles 42.

The cylindrical partition 12 is located substantially near the bottom of the batch fluid bed dryer 10 and is positioned substantially along the vertical axis of the batch fluid bed dryer 10. The cylindrical partition 12 is adjustable along the vertical axis of the batch fluid bed dryer 10 by an adjuster 20 which is external to the batch fluid bed dryer 10, which is threaded onto a bracket 22 that is welded to the cylindrical partition 12 allowing for different batch sizes to be loaded and processed in the batch fluid bed dryer 10. Since the cylindrical partition 12 is adjustable, the cylindrical partition 12 is positionable near the top of the fluidized bed 24 within the batch fluid bed dryer 10 allowing for only the top portion of the particles 42 to be fluidized. Requiring only the top portion of the particles 42 to be fluidized requires less fluidizing gas 26. Since less fluidizing gas 26 is required for this process, the particles 42 being coated or agglomerated are subjected to less stress. The collisions between the particles 42 and the dryer wall 40, and the particles 42 and the cylindrical partition 12 are less stressful because the particles' velocities are reduced. The reduced particle velocities result in a more gentle process. The gentler process allows for more uniform coating of the particles 42 because there will be fewer cracks or fractures in the coating since the collisions of the particles 42 will be gentler.

An additional effect of requiring less fluidization gas 26 is that the particle 42 size distribution will be more uniform. At lower fluidization gas rates only smaller particles 42 will be circulated within a narrow zone and be coated evenly. In contrast, where greater or stronger fluidization gas 26 rates are required, particles 42 will be fluidized and coated in a larger coating zone for the given spray flow rate, so the result particles are coated more evenly in terms of size distribution. By fluidizing the entire particle bed, all sizes of particles 42 will be recoated.

The cylindrical partition 12 preferably has a diameter-to-length ratio greater than or equal to 1. A diameter-to-length ratio greater than or equal to 1 results in turbulent flow in the coating zone 30, in which better mass/heat transfer efficiency can be achieved. Adjustability of the vertical position of the cylindrical partition 12 also aids in creating turbulent flow since less fluidization gas 26 is needed. By turbulent flow is meant that the particles 42 flow in an erratic manner within the cylindrical partition 12. Turbulent flow results in greater efficiency in the coating zone 30 for the particles 42 and the atomized liquid 46. An effect of having a greater residence time in the coating zone 30 is that the particle coatings are more efficiently completed and at a faster rate.

The spray nozzle 14 is adjustable vertically along the vertical axis relative to the cylindrical partition 12. An atomizing gas line 18 is connected to spray nozzle 14. An atomizing gas 44 is externally heated to control the coating zone 30 temperature as indicated by a thermocouple 38 located within the coating zone 30. Additionally, the liquid spray line 16 is connected to spray nozzle 14.

The atomizing gas 44 is used for atomizing the spray liquid 46 axis well as creating the coating zone 30 in which the particles 42 are contacted with the atomized liquid 46. Additionally, by controlling the atomizing gas 44 flow rate, the coating zone 30 extends above the cylindrical partition 12 allowing for more contact time between the liquid 46 droplets and the particles 42 resulting in a more efficient process. Furthermore, adjusting the position of the spray nozzle 14, nozzle size and atomizing gas 44 pressure relative to the characteristics of the liquid 46 spray prevents buildup on the inside of cylindrical partition 12 wall which allows for higher weight percentage coatings.

The particles 42 leave the coating zone 30 and fall through the reconditioning zone 34. In the reconditioning zone 34, the fluidizing gas 26, which is controlled to be cooler than the atomizing gas 44, will cool and dry the liquid 46 onto the surface of the particles 42, thereby coating the particles 42. Since the fluidizing gas 26 is cooler than the atomizing gas 44, the reconditioning zone 34 heat transfer and mass transfer are more efficient therefore ensuring a quality coating on the particles 42.

Once the particles 42 are coated in the coating zone 30, the particles fall through the reconditioning zone 34 and reenter the fluidized bed 24 of particles 42. The atomizing gas 44 will push certain particles into the coating zone and also creates a draft effect pulling particles 42 from the nearby fluidized bed 24 back into the cylindrical partition 12 and the coating zone 30. The effect of the atomizing gas 44 circulating in particles 42 from the fluidized bed 24 into the coating zone 30 is the creation of a vertical process in which particles 42 are coated several different times within one batch process. Additionally, filter bags 32 are installed on the top of the upward flowing dryer 10 to collect any fine particles 42 which would escape into the atmosphere.

An additional feature of the present invention is that no part of spray nozzle 14 is attached to the bottom screen 28. An advantage of not contacting the spray nozzle 14 with the bottom screen 28 is that heat is not conducted away from spray nozzle 14 by the bottom screen 28 and the fluidizing gas 26. By maintaining a selected temperature in the spray nozzle 14, liquids 46 with relatively high melting points such as liquid fat or hot melt, are coated onto particles 42 without operational difficulty.

The following examples are intended to illustrate the present invention and are not to be taken as a limitation in any way.

EXAMPLE 1

Eight pounds of dicalcium phosphate (particle size ranging US mesh #60 to 140) were coated with liquid fat at a 20 weight % coating. The liquid fat had a melting temperature of 113° F. Inlet fluidizing gas was heated and maintained at a temperature of 90 to 100° F. The liquid fat temperature was maintained at 180° F. to prevent the solution from setting up. The liquid fat flow rate through the spray nozzle with a 0.8 mm diameter port size was 47 milliliters per minute. The gas used to atomize the liquid fat was air which was maintained at a pressure of 2 bars. The cylindrical partition was positioned 5 inches above the bottom screen, and the spray nozzle was positioned such that the tip of the spray nozzle was at the same level as the bottom edge of the cylindrical partition.

The dicalcium phosphate particles were fluidized in the batch dryer for 27 minutes at which time the experiment was completed. The result of the experiment was that the dicalcium phosphate particles were well coated without significant fines or agglomeration.

EXAMPLES 2–5

Granulated citric acid was coated with liquid at varying weight % liquid fat coatings. The liquid fat used in these experiments was hydrogenated vegetable oil with a 140° F. melting point. Four test runs were conducted under the following parameters:

All four runs used atomizing air at a pressure of 2.0 bars. The results of the four runs were that the citric acid particles were well coated and were dust free in appearance.

EXAMPLE 6

One hundred twenty five pounds of citric acid particles were charged into a 60 kg capacity dryer and were coated with a 15 weight % liquid fat coating. A cylindrical partition with an 18 inch diameter and a 12 inch height was installed within a 60 kg capacity machine. A triple port nozzle was used as a spray nozzle with each of the three nozzles having 3 ports, each port being 1.2 mm in diameter. The reason for this is to demonstrate that the present invention can be adapted with multi-port nozzles so the speed of the coating can be increased, which is impossible for Wurster systems. The liquid fat had a melting point of 140° F. and was maintained at a temperature of 180° F. The atomizing air pressure was maintained at 3.0 bar. The cylindrical partition was positioned 3.5 inches above the bottom screen, and the triple headed spray nozzle was positioned 1 inch below the bottom of the cylindrical partition. The fluidized bed was maintained at 32° C. (90° F.) while the citric acid particles were processed for 43 minutes. Ten batches of citric acid particles were processed under the above conditions with the result being that quality coatings were made on each occasion.

EXAMPLE 7

A 5 kg capacity dryer was charged with 8.5 pounds of crystalline starch. The crystalline starch was coated with a liquid fat with a 117° F. melting point at a 15 weight % coating. The liquid fat was maintained at 145° F. to prevent the solution from solidifying and block the liquid delivery system. The cylindrical partition was positioned 6.5 inches above the bottom screen. The spray nozzle was positioned even with the bottom edge of the cylindrical partition and was equipped with a nozzle with a 1.5 mm diameter opening that created a full cone type of spray pattern. The coated crystalline starch particles were maintained at a temperature of 30° C. (86° F.). The crystalline starch particles were fluidized for 26 minutes with an atomizing air pressure of 2.5 bar. The resultant particle size profiles are shown in FIG. 3. The coated starch particles were subjected to a lab leakage test in which the starch particles were placed in water and the water was titrated with iodine to see if any starch was present in the water. There was no indication of starch in the water which indicates a good continuous coating surrounding the entire particle.

EXAMPLE 8

A 5 kg capacity dryer was charged with 9 pounds of ascorbic acid fine crystals to be coated with a 10% by weight

TABLE 1

| Weight Gain % | Bowl Charge Lb. | Insert Level[1] Inch | Nozzle Position[2] Inch | Nozzle Port D. mm | Inlet air Temp ° F. | Prod. Temp ° F. | Liquid Temp ° F. | Nozzle Temp ° F. | Spray Rate ml/min |
|---|---|---|---|---|---|---|---|---|---|
| 10 | 8 | 5.5 | −1 | 1.8 | 110 | 113 | 220 | 140 | 40 |
| 15 | 8 | 5.5 | −1 | 1.8 | 104 | 122 | 190 | 140 | 47 |
| 20 | 8 | 6 | −1 | 1.8 | 86 | 90 | 190 | 140 | 38 |
| 40 | 6 | 6 | −1 | 1.8 | 88 | 91 | 200 | 140 | 35 |

[1]The insert level is the distance between the bottom screen and the bottom edge of the cylindrical partition.
[2]The nozzle position is the distance between the tip of the spray nozzle and the bottom edge of the cylindrical partition.

fat coating. The liquid fat had a melting point of 140° F. and was maintained at 200° F. to prevent the solution from setting up. The cylindrical partition was positioned 4.5 inches above the bottom screen. The spray nozzle position was even with the bottom edge of the cylindrical partition and was equipped with a 1.5 mm diameter port designed to produce a flat spray pattern. Atomizing air was processed through the spray nozzle at a pressure of 2.25 bar. The crystals were fluidized for 27 minutes during which time the product temperature was recorded at 30° C. (86° F.). The result of the experiment was that the ascorbic acid fine crystals were well coated with no agglomeration.

EXAMPLE 9

A 5 kg capacity dryer was charged with 10 pounds of salt for coating with a 30 weight % fat coating. The liquid fat had a melting point of 140° F. and was maintained at a temperature of 200° F. The cylindrical partition was positioned 5.5 inches above the bottom screen. The nozzle was positioned at 0.5 inches (to accommodate the heavy density of salt so fluidization can be improved) above the bottom edge of the cylindrical partition and was equipped with a nozzle tip with a 0.8 mm diameter port. Atomizing air was processed through the spray nozzle at a pressure of 1.75 bar. The particles were fluidized for 39 minutes during which time the coated salt particles were at a temperature of 30° C. (86° F.). The result of this experiment was that the salt was well coated without agglomeration.

EXAMPLE 10

An experiment was conducted to compare the coating ability of the present invention with a top spraying dryer in which the particles are upwardly flowing and the liquid is downwardly flowing. Each dryer was run to produce a 10 weight % fat coating onto citric acid particles under the same process conditions.

The fat coated citric acid particles from each dryer were placed in deionized water and conductivity was measured after 10 seconds. The particles coated using the present invention had a conductivity reading of about 0.4 millihos after 10 seconds. The fat coated citric acid particles produced using the top spray coater had a conductivity reading of about 1.1 millihos after 10 seconds. The particles coated using the present invention leaked 2½ times less citric acid into the deionized water than the particles produced using the top sprayer.

Figure 2:
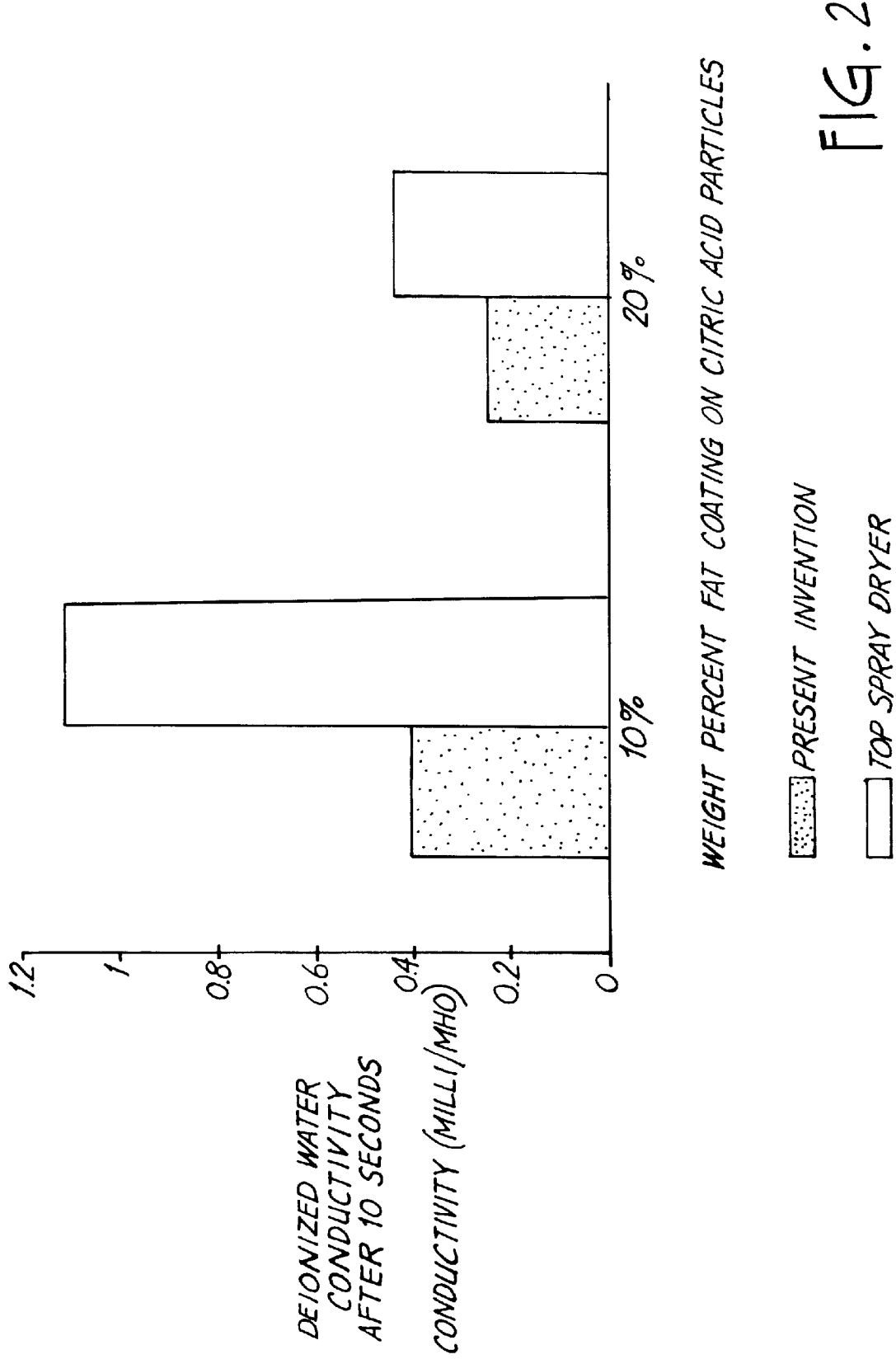
FIG. 2 is a graphical representation of a comparative experiment in which a fluid bed dryer based coating system of the present invention was compared with a downward spraying coating in the effectiveness of coating hot melt fat onto citric acid particles.

Additionally, a parallel experiment was run coating the citric acid particles with a 20 weight % fat coating. Again, the particles were submerged in deionized water after being coated and the conductivity was measured 10 seconds after the particles were submerged. The conductivity readings of the citric acid particles that were coated by the present invention had a reading of about 0.25 millihos, whereas the particles coated using the top spray coater had a reading of about 0.42 millihos. Significantly, a 10 weight % coating using the present invention had a lower conductivity reading than a 20 weight % coating using a top spray coater. Therefore, the present invention is almost twice as efficient at coating fat onto citric acid particles than the top spray coating method. These results are graphically illustrated in FIG. 2.

Set forth below is a comparative table comparing uncoated starch samples with starch coated using the present invention and using a top spray coater. As the table indicates, starch particles coated by the present invention better reflect the size distribution of uncoated particles unlike coating with a top spray which produces a particle size distribution significantly different then the original uncoated starch particles

TABLE 2

Particle Size Distribution of Uncoated and Coated Starch Particles

| U.S. Mesh Size | Uncoated Starch | Present Invention (Coated Starch) | Top Spray (Coated Starch) |
| --- | --- | --- | --- |
| 20 | 0.0 | 0.0 | 0.0 |
| 40 | 0.0 | 0.4 | 87.0 |
| 60 | 0.0 | 0.6 | 10.0 |
| 100 | 0.6 | 1.6 | 3.0 |
| 140 | 0.8 | 6.4 | 0.0 |
| 200 | 45.8 | 62.0 | 0.0 |
| Pan | 52.8 | 29.0 | 0.0 |

Besides being capable of processing liquid fat, the present invention is also capable of coating aqueous systems, solvent systems, and combination systems containing aqueous systems and then a hot melt coating, or a solvent system and a hot melt coating.

EXAMPLE 11

To coat #2 capsules with a 1 weight % cellulose coating, a 5 kg capacity dryer was charged with 9.9 pounds of #2 capsules. An 8% cellulose aqueous solution at room temperature was processed onto the #2 capsules with a spray nozzle equipped with a 1.5 mm diameter port designed to create a flat spray pattern. Atomizing air was supplied to the nozzle at a pressure of 3.25 bar. The cylindrical partition was positioned 8 inches above the bottom screen and the spray nozzle was positioned 1 inch below the bottom edge of the cylindrical partition. The capsules were fluidized for 36 minutes during which time the coated particle temperature was 53° C. (127° F.). The result of this experiment was that the capsules were well coated without broken capsules in the batch.

EXAMPLE 12

A solvent system coating was deposited on enteric capsules using a 30 weight % shellac solution to produce a 2% (dried weight) coating of shellac. A 5 kg capacity dryer was charged with 9 pounds of enteric capsules. The spray liquid was maintained at 78° F. and was processed through a spray nozzle with a 1.5 mm diameter port designed to produce a flat spray pattern. The cylindrical partition was positioned 8 inches above the bottom screen and the nozzle was positioned 1 inch above the bottom edge of the cylindrical partition. Atomizing air was processed through the spray nozzle at a pressure of 2.0 bar. The batch was fluidized for 22 minutes during which time the coated particles were at a temperature of 60° C. (140° F.). The result of the experiment was that the capsules were well coated.

EXAMPLE 13

An experiment was performed coating crystalline starch particles with a solvent system coating followed by a hot melt coating. The crystalline starch particles were coated with ethyl cellulose to produce a 1 weight % coating. The ethyl cellulose coated particles were then coated with a 14 weight % liquid fat coating.

These examples illustrate the flexibility of the present invention in that not only can liquid fat be coated onto particles in a fluidized bed, but also aqueous solutions and solvent based systems can be coated onto particles in a fluidized bed. Furthermore, the present invention is capable of processing any combination of aqueous solutions, solvent based systems, and hot melt (fat) systems.

Although the present invention has been described with reference to preferred embodiments, workers skilled in the art will recognize that changes may be made in form and detail without departing from the spirit and scope of the invention.

What is claimed is:

1. An apparatus in an upward flowing fluidized bed granulator or dryer with a screen positioned across the bottom of the granulator or dryer, the apparatus comprising:

a cylindrical partition with a diameter to length ratio that is greater than or equal to 1;

a coating zone extending above the cylindrical partition; and a spray nozzle upwardly positioned below the cylindrical partition in a non-heat conducting relation to the screen to provide spray within the cylindrical partition to spray coating solution.

2. The apparatus in claim 1 wherein the cylindrical partition is located substantially near the bottom portion of the granulator or dryer.

3. The apparatus in claim 1 wherein the cylindrical partition is located substantially along a vertical axis of the fluidized bed granulator and is adjustable along the vertical axis.

4. The apparatus in claim 3 wherein the cylindrical partition is adjustable substantially on the vertical axis by a level control external to the granulator or dryer.

5. The apparatus in claim 5 where the spray nozzle is located in the granulator or dryer substantially along a vertical axis of the fluidized bed granulator or dryer.

6. The apparatus in claim 5 wherein the spray nozzle is adjustable along the vertical axis, related to the cylinder.

7. The apparatus in claim 1 wherein an atomizing gas line is connected to the spray nozzle.

8. The apparatus in claim 1 wherein a liquid line is connected to the spray nozzle.

9. The apparatus in claim 8 where the liquid line is heated.

10. An apparatus within an upward flowing fluidized bed dryer or granulator with a screen across the bottom of the dryer or granulator, the apparatus comprising:

a cylindrical partition with a diameter-to-length ratio greater than or equal to 1;

a coating zone extending above the cylindrical partition;

a spray nozzle positioned in a non-heat conducting relation to the bottom screen, the spray nozzle being adjustable along a vertical axis of the dryer or granulator to provide a liquid spray within the cylindrical partition;

an atomizing gas line connected to the spray nozzle; and a liquid line connected to the spray nozzle.

11. The apparatus in claim 10 wherein the spray nozzle is located substantially along a vertical axis.

12. The apparatus in claim 10 wherein the spray nozzle is adjustable along the vertical axis such that the tip of the spray nozzle is positionable within the cylindrical partition or being positioned below the cylindrical partition.

13. The apparatus of claim 10 wherein the cylindrical partition is adjustable along the vertical axis.

14. The apparatus in claim 10 wherein the cylindrical partition is substantially located along the vertical axis.

15. The apparatus in claim 10 wherein the liquid line is heated.

16. An apparatus of claim 10, where the spray nozzle is attached to the cylindrical partition.

17. An apparatus of claim 16, wherein the spray nozzle being further adjustable along a vertical axis in relation to the cylindrical partition.

18. An apparatus of claim 10, wherein the spray nozzle has a nozzle top, the top being positioned within a +/−2 inch zone from the bottom of the cylindrical partition.

19. An apparatus of claim 10, further comprising:

means to form a liquid spray formed by the nozzle spray when sprays a liquid, the perimeter of the liquid spray defining a spray shape, the spray shape substantially not contacting the cylindrical partition.

20. An apparatus of claim 10, the cylindrical partition has a partition top and a partition bottom, the apparatus further comprising:

means to form a fluidized bed of particles, the fluidized bed having a top, the top not being higher than the top of the partition.

21. An apparatus of claim 20, wherein the fluid bed includes substantially only a top portion of the particles, a bottom portion of the particles being substantially not fluidized, and the particles randomly moving between the lower portion to the top portion.

22. A fluid bed coating insert which can be removably inserted within an upward flowing fluidized bed dryer or granulator with an induct portion for introducing a fluidizing gas, the insert comprising:

a cylindrical partition with a diameter-to-length ratio greater than or equal to 1;

a spray nozzle attached to the cylindrical partition and capable of being positioned in a non-heat conducting relation to the fluidizing gas induct portion of the fluidized bed dryer or granulator, the spray nozzle being adjustable along a vertical axis of the dryer or granulator to provide a liquid spray within the cylindrical partition;

an atomizing gas line connected to the spray nozzle; and a liquid line connected to the spray nozzle.

* * * * *